(12) United States Patent
Chamberlayne

(10) Patent No.: US 8,292,521 B2
(45) Date of Patent: *Oct. 23, 2012

(54) CAMERA CARRYING DEVICE WITH LOCKING MECHANISM

(76) Inventor: Andrew Chamberlayne, North Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,395

(22) Filed: Jun. 14, 2011

(65) Prior Publication Data

US 2011/0243544 A1    Oct. 6, 2011

Related U.S. Application Data

(63) Continuation of application No. 12/202,922, filed on Sep. 2, 2008, now Pat. No. 7,980,771, which is a continuation-in-part of application No. 12/026,016, filed on Feb. 5, 2008.

(51) Int. Cl.
*G03B 17/00* (2006.01)
(52) U.S. Cl. ........................................................ 396/423
(58) Field of Classification Search .......... 396/419–423, 396/425, 428; 348/373, 375–376; 224/153, 224/197, 271–272
See application file for complete search history.

(56) References Cited

U.S. PATENT DOCUMENTS

| 2,130,262 | A | 9/1938 | Burlin |
| 2,723,430 | A | 11/1955 | Paillard |
| 2,990,089 | A | 6/1961 | Nystrom |
| 3,884,403 | A | 5/1975 | Brewer |
| 3,938,166 | A | 2/1976 | Sloop |
| 4,058,242 | A | 11/1977 | Brewer |
| 4,328,917 | A | 5/1982 | Reeberg |
| 4,416,405 | A | 11/1983 | Caillouet |
| 4,419,794 | A | 12/1983 | Horton et al. |
| 4,461,411 | A | 7/1984 | Harrow |
| 4,473,177 | A | 9/1984 | Parandes |

(Continued)

FOREIGN PATENT DOCUMENTS

GB    871489    6/1961

(Continued)

OTHER PUBLICATIONS

Abstract of Japanese Publication No. 2003116621 with data supplied by the espacenet database Apr. 22, 2003.

(Continued)

*Primary Examiner* — W. B. Perkey
*Assistant Examiner* — Minh Phan
(74) *Attorney, Agent, or Firm* — Cameron IP

(57) ABSTRACT

A device for rotatably mounting a camera on a person comprises first and second connecting means. The first connecting means has a U-shaped slot which is defined by a pocket and a pair of opposed channels which extend from the pocket. The second connecting means has a plate and a truncated cylindrical body mounted on the plate. The plate is slidably received by the U-shaped slot and is rotatable within the U-shaped slot. The truncated cylindrical body is provided with a flat edge. A threaded member extends from one of said first connecting means or said second connecting means. The threaded member is for engaging a threaded female tripod receiver of the camera. The plate of the second connecting means can only be received or released from the U-shaped slot of first connecting means when the flat edge to the truncated cylindrical body of the second connecting means is aligned with one of said opposed channels of the first connecting means.

14 Claims, 17 Drawing Sheets

U.S. PATENT DOCUMENTS

| | | | |
|---|---|---|---|
| 4,714,184 | A | 12/1987 | Young et al. |
| 5,014,892 | A | 5/1991 | Copeland |
| 5,172,838 | A | 12/1992 | Rowell et al. |
| 5,251,800 | A | 10/1993 | Leenders |
| 5,375,749 | A | 12/1994 | Oliva |
| 5,850,954 | A | 12/1998 | Dong-Joo |
| 5,850,996 | A | 12/1998 | Liang |
| 6,905,051 | B2 * | 6/2005 | Chee .............................. 224/197 |
| 7,162,281 | B2 | 1/2007 | Kim |
| 7,624,901 | B1 | 12/2009 | Mozes |
| 2003/0098323 | A1 | 5/2003 | Taylor et al. |
| 2004/0200867 | A1 | 10/2004 | Chee |
| 2009/0196596 | A1 | 8/2009 | Chamberlayne |
| 2010/0054724 | A1 | 3/2010 | Chamberlayne |

FOREIGN PATENT DOCUMENTS

| | | |
|---|---|---|
| JP | WO 97/36516 | 10/1997 |
| JP | 2000321655 | 11/2000 |
| JP | 2003116621 | 4/2003 |
| WO | WO 83/01370 | 4/1983 |
| WO | WO 2009/039292 A1 | 3/2009 |

OTHER PUBLICATIONS

Abstract of Japanese Publication No. 2000321655 with data supplied by the espacenet database Nov. 24, 2000.

* cited by examiner

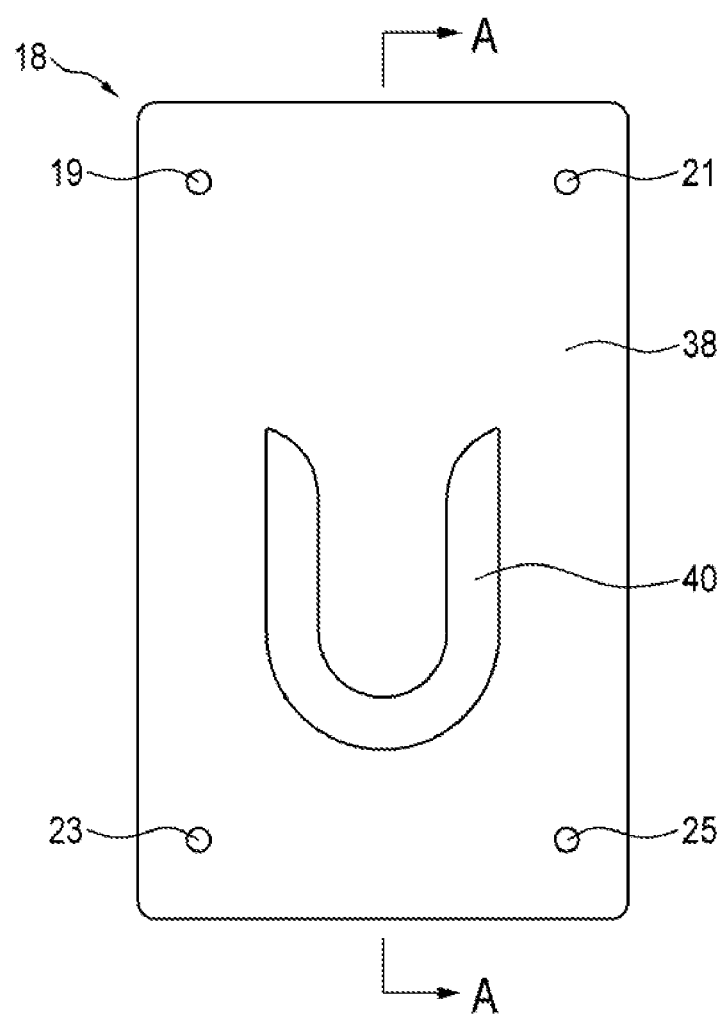
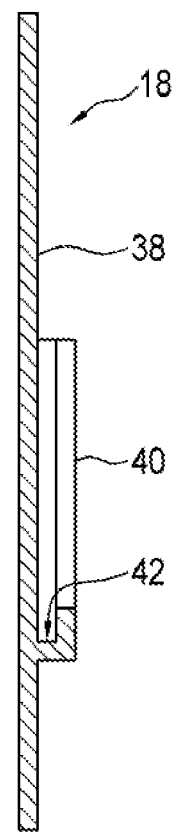
FIG. 7
FIG. 8

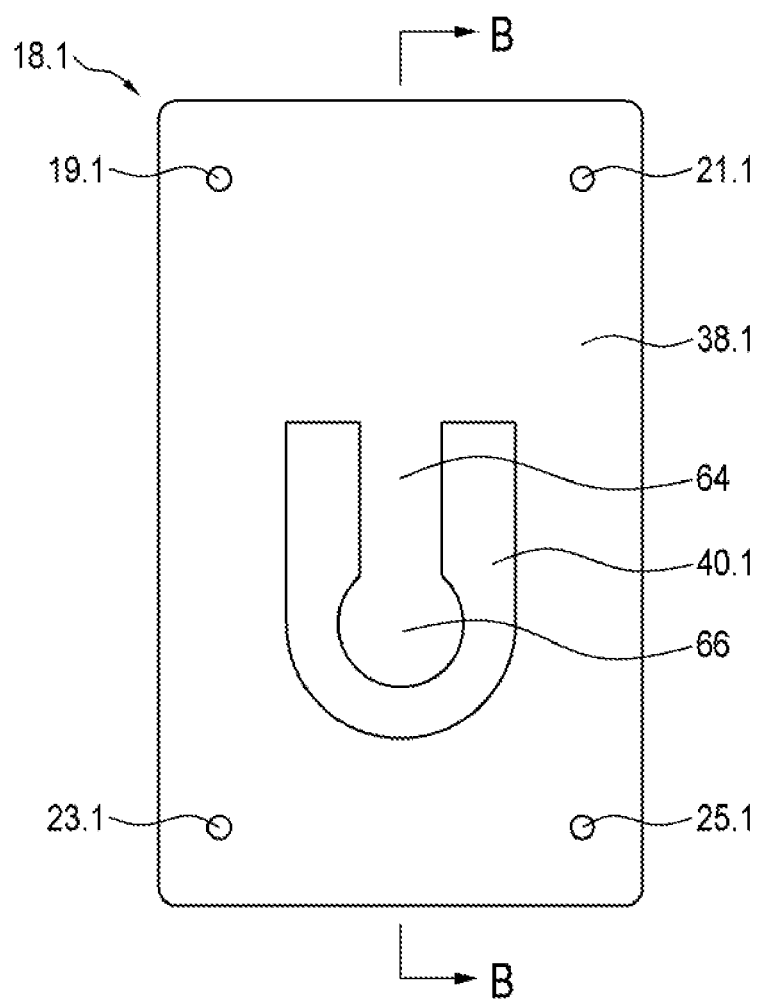 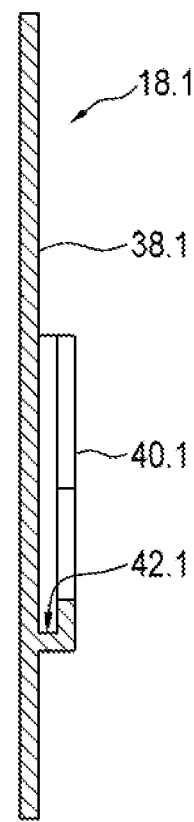
FIG. 13
FIG. 14

CAMERA CARRYING DEVICE WITH LOCKING MECHANISM

CROSS REFERENCE TO RELATED APPLICATIONS

This application is a continuation of U.S. patent application Ser. No. 12/202,922 filed on Sep. 2, 2008 now U.S. Pat. No. 7,980,771 which is a continuation-in-part of U.S. patent application Ser. No. 12/026,016 filed on Feb. 5, 2008. The full disclosures of the aforementioned are hereby incorporated herein by reference and priority to the same is claimed.

BACKGROUND OF THE INVENTION

The present invention relates to a camera carrying device and, in particular, to a device for rotatably mounting a camera on a person.

Camera carrying devices are well known, the simplest being a strap, secured to a camera, which allows a person to carry the camera around their neck or shoulder. However, the strap allows the camera to swing freely about the person. The camera may therefore become damaged upon impact with the person or another object. The strap may also become entangled with either the camera, the person, or another object and consequently interfere with the person's ability to take a picture. To overcome the above-mentioned shortcomings numerous body-mounted camera cases have been developed. Carrying a camera disposed within a body-mounted camera case removes the need to have a strap secured to the camera. However, body-mounted camera cases are also limiting. The time required to remove the camera from within the case may prevent a person from taking a desired picture, particularly, in situations where the scene is fluid.

U.S. Pat. No. 5,375,749 to Oliva discloses a multi-purpose holster apparatus that may be used to carry a camera, and which offers an alternative to traditional camera straps and cases. The holster apparatus disclosed by Oliva comprises a frame (20) that is received on a belt or a waistband. A sleeve (24) is integrally formed with and protrudes from the frame (20). The sleeve (24) is designed for releasable engagement with an interlocking plate (36). The interlocking plate (36) supports threaded bolt (31) which is designed to fit into a threaded female tripod receiver of a camera. Accordingly, the holster apparatus disclosed by Oliva may be used to carry a camera on the waist. However, it is awkward for a person to carry a larger camera, similar to the type used by a professional photographer, on their waist. Furthermore, it is difficult for a person to operate certain features of a camera since the camera is neither rotatable nor at chest level.

There is therefore a need for an improved camera carrying device.

SUMMARY OF THE INVENTION

It is an object of the present invention to provide a device for rotatably mounting a camera on a person and, in particular, on a person's chest.

According to one embodiment there is provided a device for rotatably mounting a camera on a person. The device comprises first and second connecting means. The first connecting means has a U-shaped slot which is defined by a pocket and a pair of opposed channels which extend from the pocket. The second connecting means has a plate and a truncated cylindrical body mounted on the plate. The plate is slidably received by the U-shaped slot and is rotatable within the U-shaped slot. The truncated cylindrical body is provided with a flat edge. A threaded member extends from one of said first connecting means or said second connecting means. The threaded member is for engaging a threaded female tripod receiver of the camera. The plate of the second connecting means can only be received or released from the U-shaped slot of first connecting means when the flat edge to the truncated cylindrical body of the second connecting means is aligned with one of said opposed channels of the first connecting means. Preferably one of said first connecting means or said second connecting means is secured to a backpack strap.

The device disclosed herein provides the advantage of allowing a person to comfortably carry an easily retrievable camera. The device also provides the advantage of allowing a person to operate various features of the camera while carrying the camera in a hands-free manner. For example, the device allows for the changing of telescopic lens and the viewing of a rear screen of a digital camera.

Furthermore, the device is provided with a locking mechanism which prevents the carried camera from becoming accidentally decoupled from the device.

BRIEF DESCRIPTION OF THE DRAWING

Referring to the drawings:

FIG. 7 is a front elevation view of the female connector of FIG. 6;

FIG. 8 is an elevation, cross-sectional view taken down line A-A of FIG. 7;

FIG. 13 is a front elevation view of another embodiment of the female connector of the device of FIG. 4;

FIG. 14 is an elevation, cross-sectional view taken down line B-B of FIG. 13;

DETAILED DESCRIPTION OF THE PREFERRED EMBODIMENT

Figure 1:
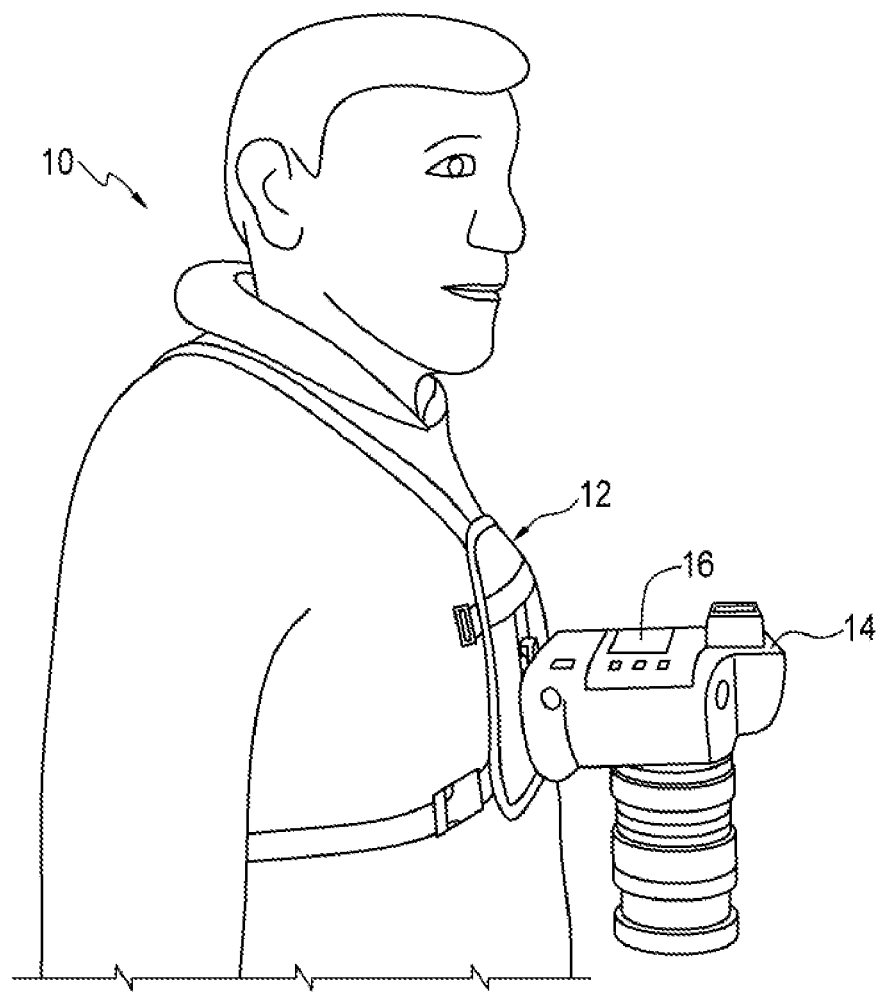
FIG. 1 is a side perspective view showing a camera rotatably mounted on a person, by a device according to an embodiment of the invention, wherein the camera is in a first position.
Figure 2:
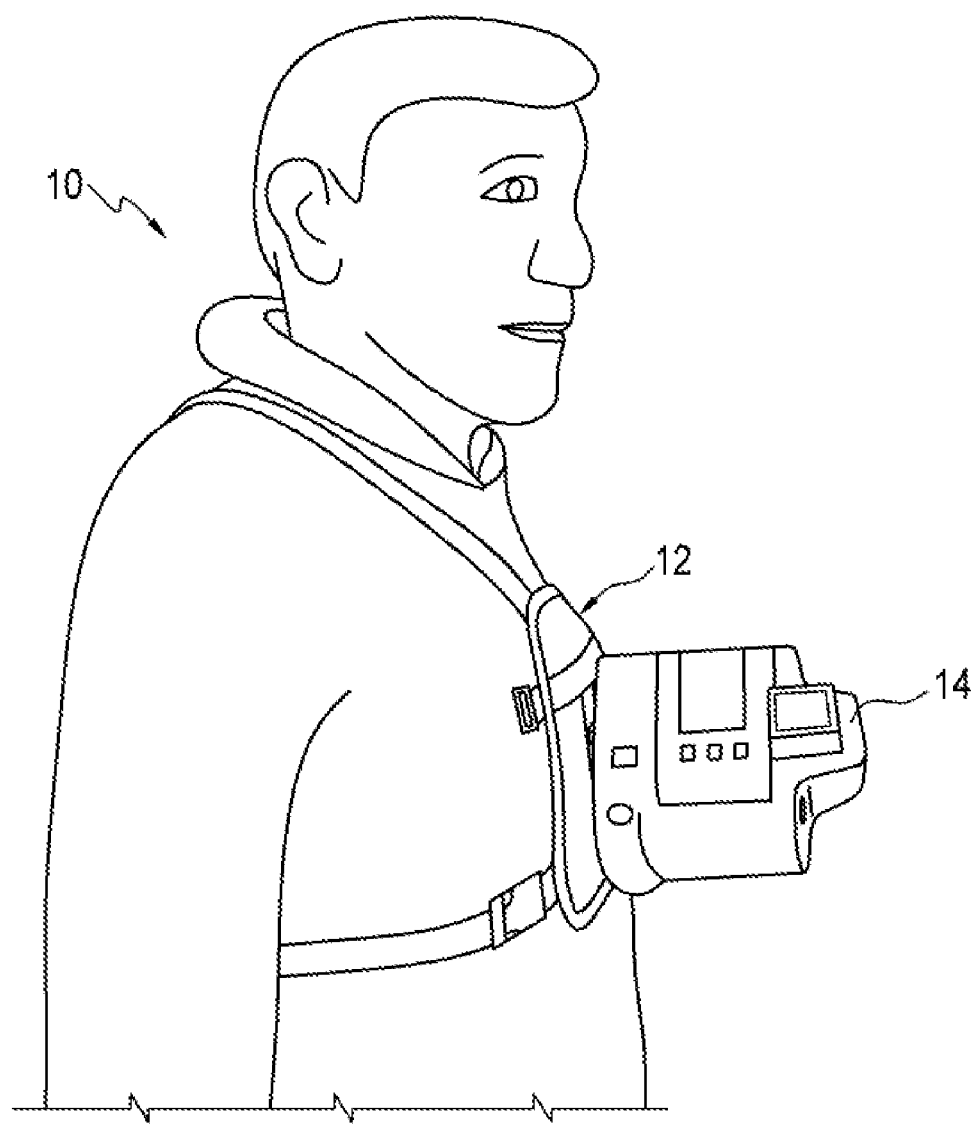
FIG. 2 is a side perspective view showing a camera rotatably mounted on a person wherein the camera is in an intermediate position.
Figure 3:
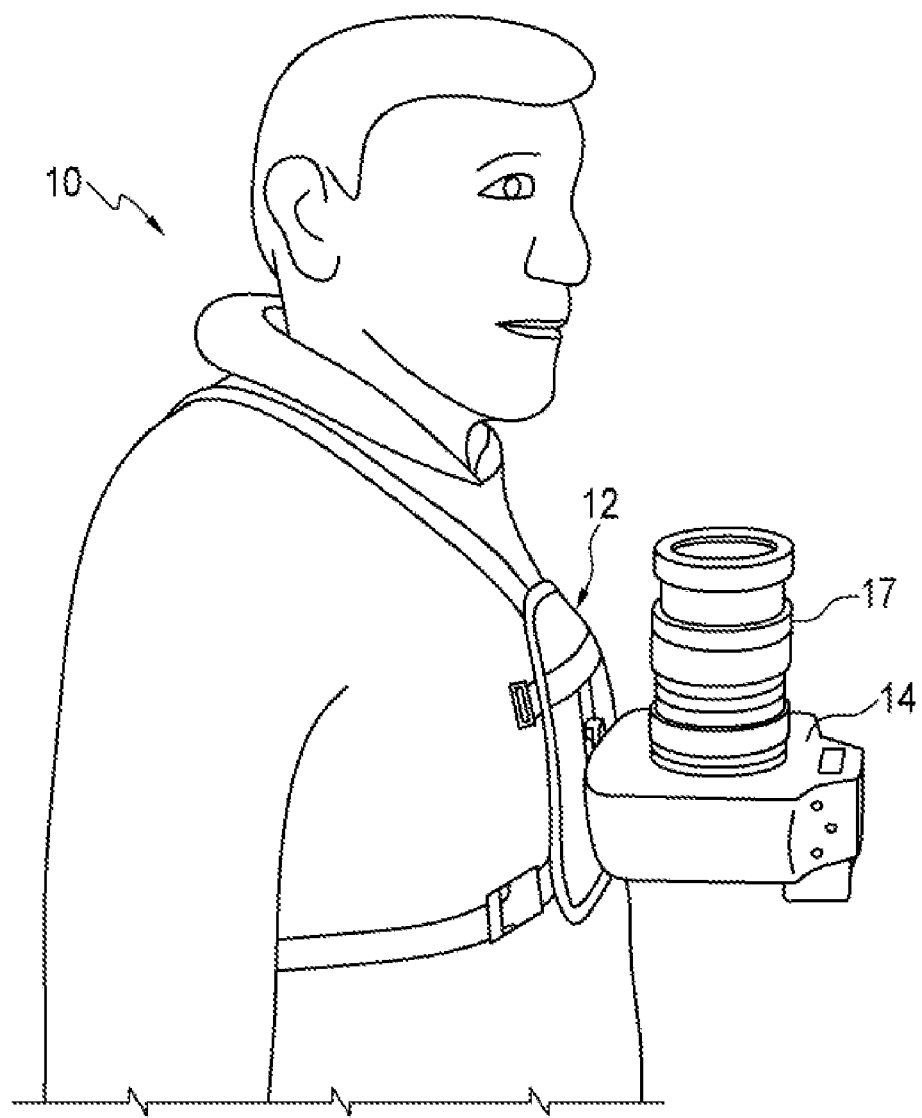
FIG. 3 is a side perspective view showing a camera rotatably mounted on a person wherein the camera is in a second position.

Referring to the drawings, and first to FIGS. 1 to 3, a person 10 is shown wearing a device 12 with a camera 14 rotatably secured thereon. FIG. 1 shows the camera 14 in a first position. In the first position, the camera 14 faces downwardly, allowing the person 10 to view digital photographs, or video, on a screen 16 disposed on a back of the camera 14. FIG. 3 shows the camera 14 in a second position. In the second position, the camera 14 faces upwardly, allowing the person 10 to change a lens 17 disposed on a front of the camera 14. The second position is particularly useful for professional photographers who are often required to change lenses. FIG. 2 shows the camera 14 in an intermediate position as it is rotated between the first and second positions. It will be understood by a person skilled in the art that the terms "downwardly" and "upwardly" are used solely in relation to the position of the camera 14 as shown in FIGS. 1 and 3 respectively. It will further be understood by a person skilled in the art that although the device 12 disclosed herein is particularly useful for carrying a digital camera, other forms of equipment may be carried using the device 12.

Figure 4:
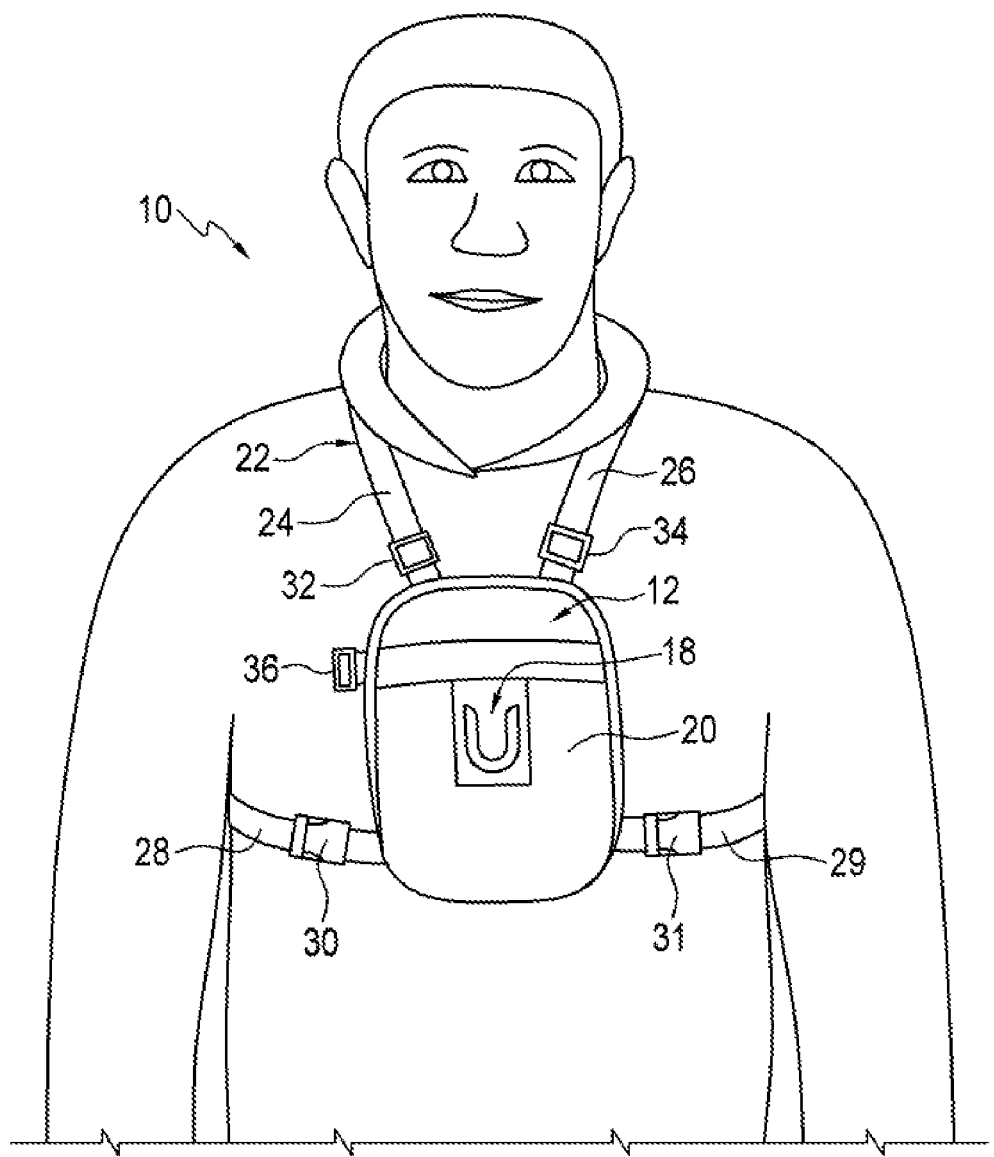
FIG. 4 is a front perspective showing view a device used to rotatably mount a camera on a person wherein the device is secured to the person by a strap assembly.
Figure 21:
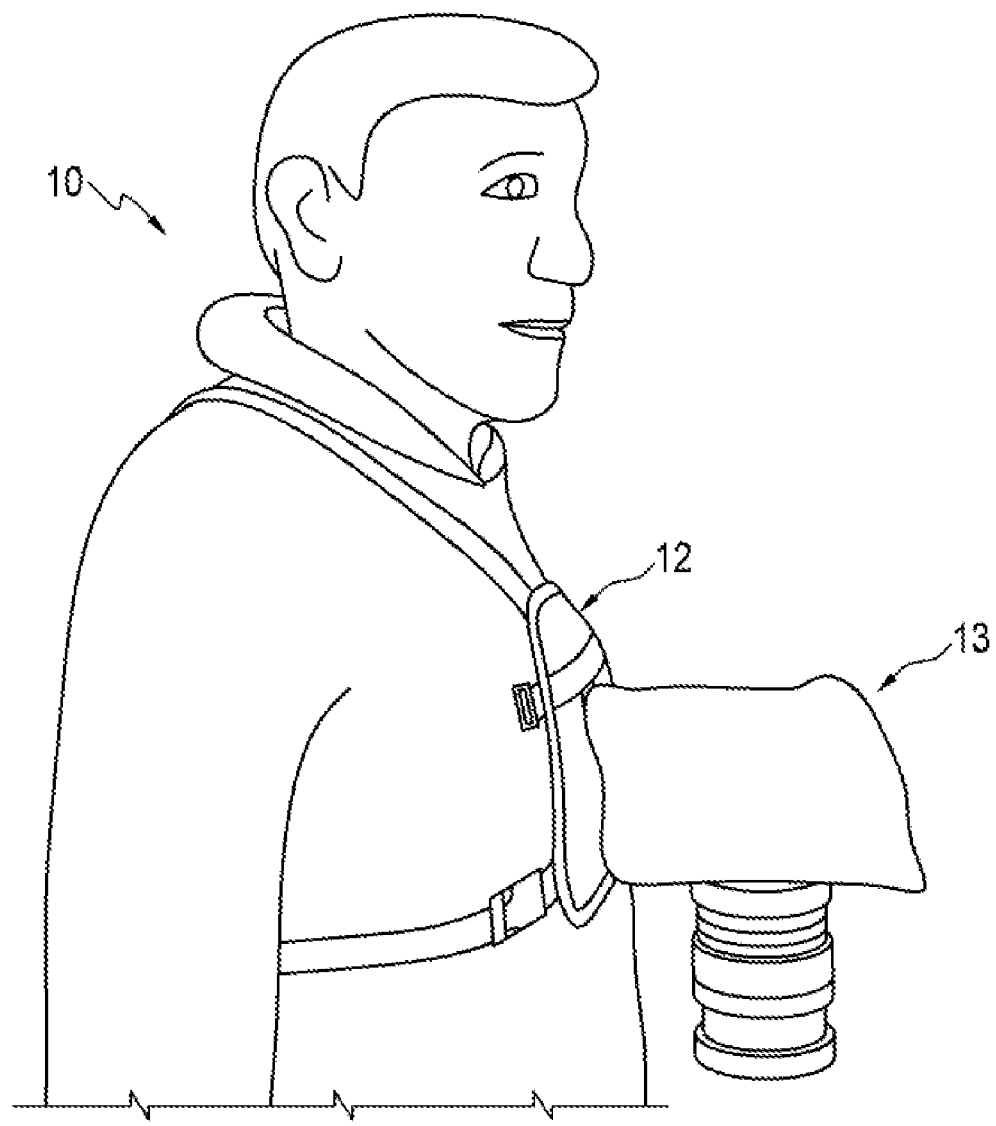
FIG. 21 is a side perspective view showing a camera rotatably mounted on a person wherein the camera is covered by a tarp.

Referring now to FIG. 4, the person 10 is shown wearing the device 12 without the camera 14 secured thereto. The device 12 comprises a first connecting means, in the form of a female connector 18, which is mounted on the person's chest. In this example, the female connector 18 is disposed within a fabric jacket 20 although this is not a requirement. The female connector 18 and the fabric jacket 20 are mounted on the person 10 using a strap assembly 22. The strap assembly 22 comprises securing and adjusting means for securing and adjusting straps 24, 26, 28, and 29 about the person. In this example, the securing and adjusting means comprise buckles 30 and 31 and tension straps 32 and 34. However, any suitable form of fastener may be used. Means for allowing additional equipment to be connected to the device 12, for example a tension strap 36 as shown in FIG. 4, may also be provided on either the fabric jacket 20 or any one of the straps 24, 26, 28, and 29. FIG. 21 shows a tarp 13 attached to the fabric jacket 20. The tarp 13 may be used to cover the camera 14 to protect it from rain, snow, or other elements.

Figure 5:
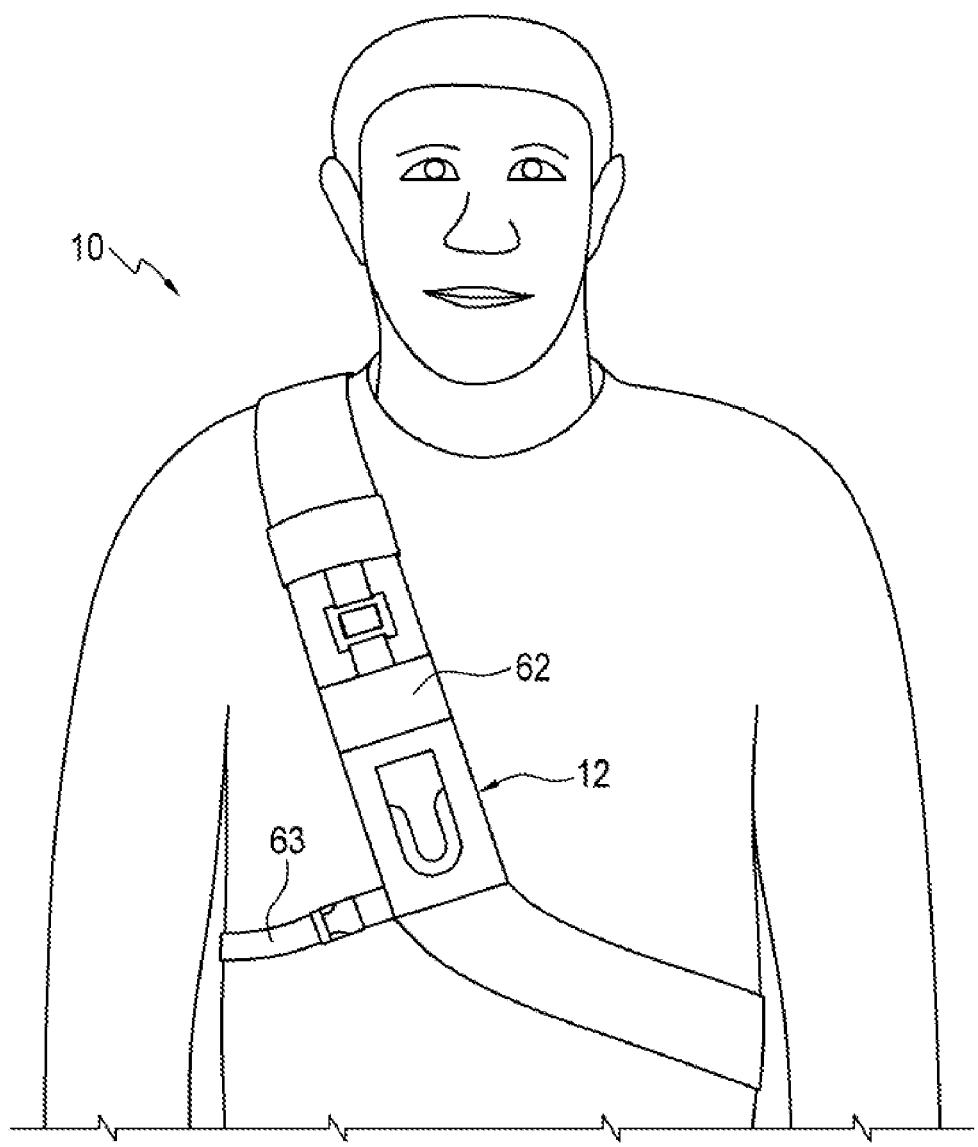
FIG. 5 is a front perspective view showing a device used to rotatably mount a camera on a person wherein the device is integrated into a backpack strap.

As shown in FIG. 5, the device 12 may alternatively be secured to a backpack strap 62. The device 12 may be integrated into the backpack strap 62 during the manufacturing of the backpack (not shown) or the device 12 may be secured to and released from the backpack strap 62 as an independent accessory. Preferably, the device 12 is also secured to a secondary strap 63 of the backpack. This helps ensure that the device is maintained in a desired position as the person 10 moves.

Figure 6:
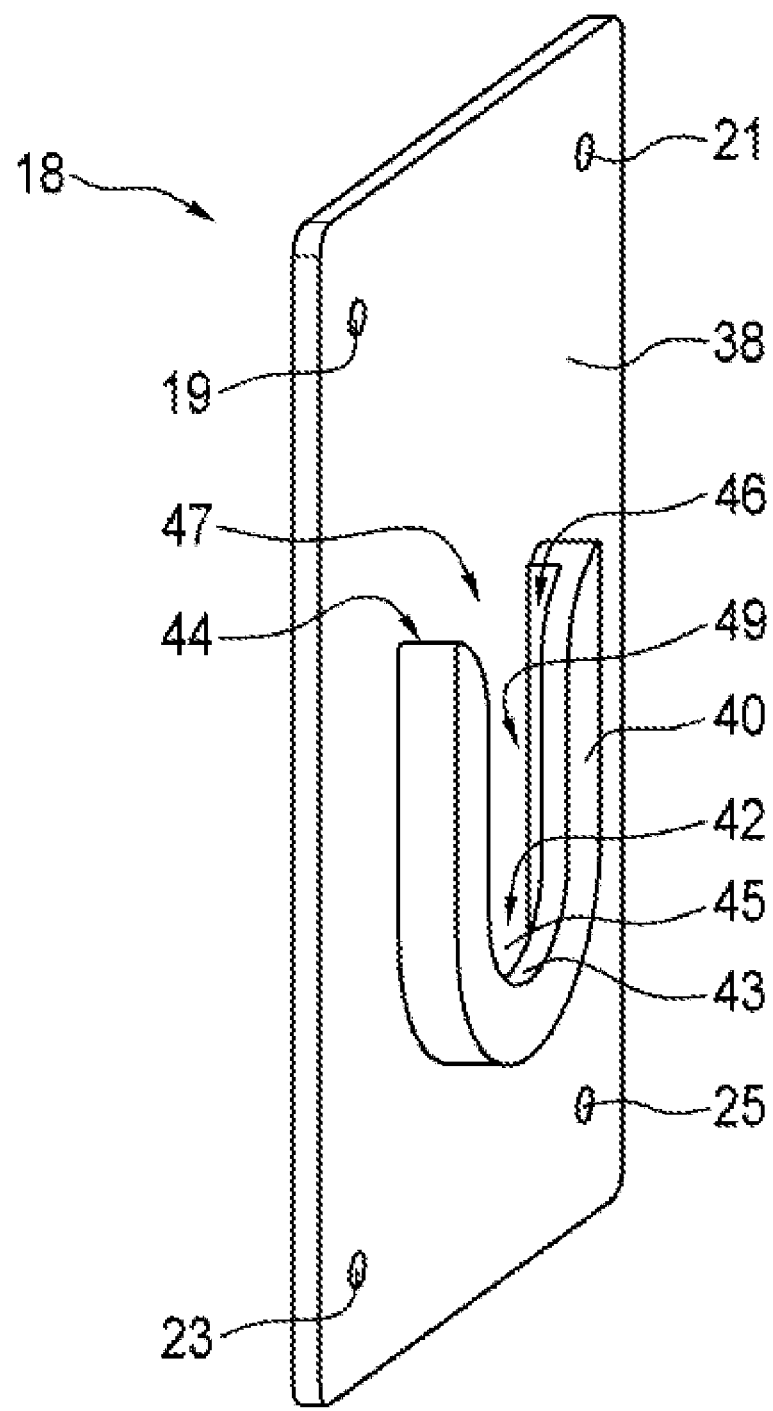
FIG. 6 is a perspective view showing a female connector of the device of FIG. 4.

The female connector 18, which is shown in greater detail in FIGS. 6 to 8, includes a plate 38 and a hollow U-shaped protrusion 40. The U-shaped protrusion is integrally formed with and protrudes from the plate 38. In this example, the plate 38 is generally rectangular and has apertures 19, 21, 23, and 25 near each corner thereof. The apertures 19, 21, 23, and 25 provide means to connect the female connector 18 to the fabric jacket 20. Alternatively, in another embodiment, the apertures 19, 21, 23, and 25 may be used to connect the female connector 18 directly to the strap assembly 22.

As best shown in FIG. 6, the plate 38 and the U-shaped protrusion 40 define a generally curved pocket 42 and a pair of opposed channels 44 and 46 which extend from the pocket 42. The pocket 42 and the channels 44 and 46 define a U-shaped receptacle, or U-shaped slot 49, which may slidably receive a plate through an opening 47 disposed between the channels 44 and 46. There is a lip 43 at a mouth 45 of the pocket 42.

Figure 9:
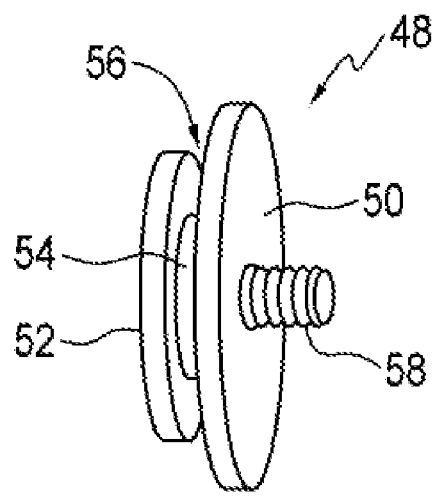
FIG. 9 is a perspective view showing a male connector of the device of FIG. 4.
Figure 10:
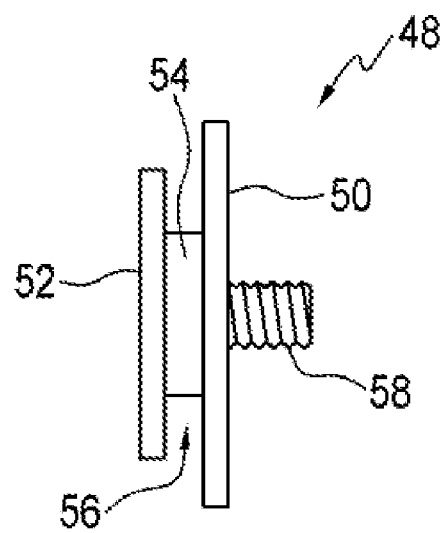
FIG. 10 is a side elevation view of the male connector of FIG. 8.
Figure 20:
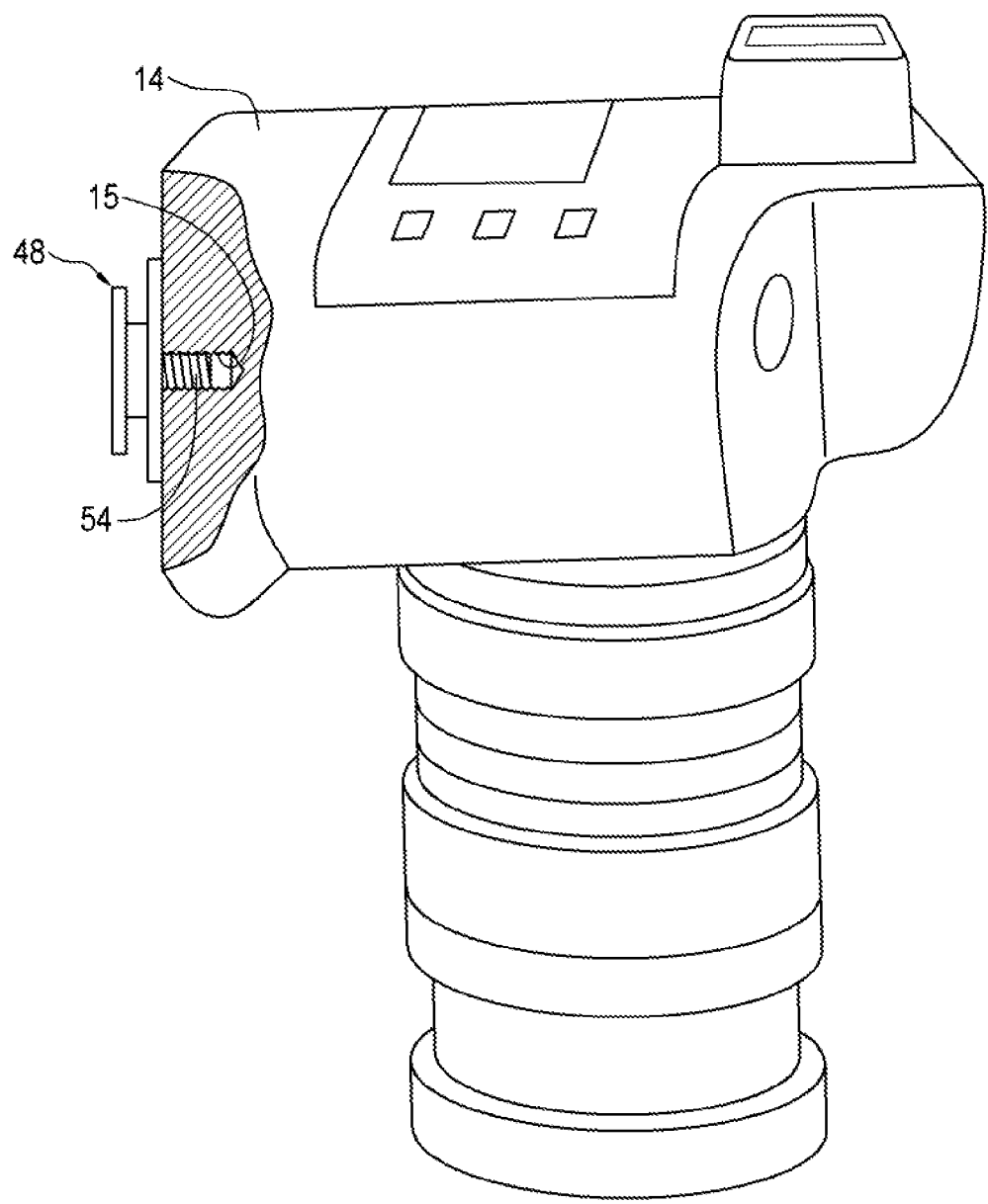
FIG. 20 is a perspective view, partially in section, showing the male connector of FIG. 9 engaged with a threaded female tripod receiver of a camera.

Referring now to FIGS. 9 and 10, a second connecting means of the device 12, in the form male connecter 48, is shown in greater detail. The male connector 48 includes a pair of circular plates 50 and 52 which are spaced-apart by a cylindrical body 54. The cylindrical body 54 has a smaller diameter than the plates 50 and 52, and defines an annular recess 56 between the plates 50 and 52. In this example, the plates 50 and 52 differ in diameter although this is not a requirement. A threaded member 58 extends outwardly from the male connector 48. The threaded member 58 is designed to engage a threaded female tripod receiver 15 of the camera 14 as best shown in FIG. 20. The plates 50 and 52 may also be grooved (not shown) along their circumferences to assist a person in gripping the male connector 48 when screwing the threaded member 58 into the female tripod receiver 15 of the camera 14.

Figure 11:
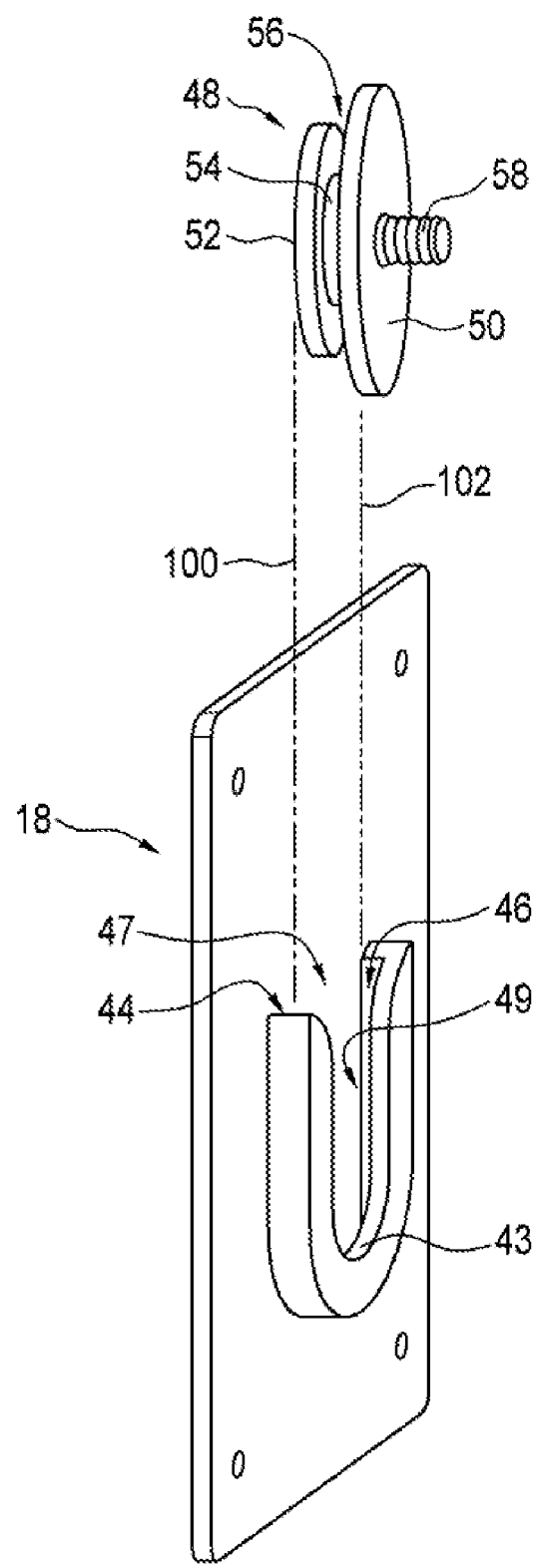
FIG. 11 is an exploded view showing the female connector of FIG. 6 and the male connector of FIG. 9.
Figure 12:
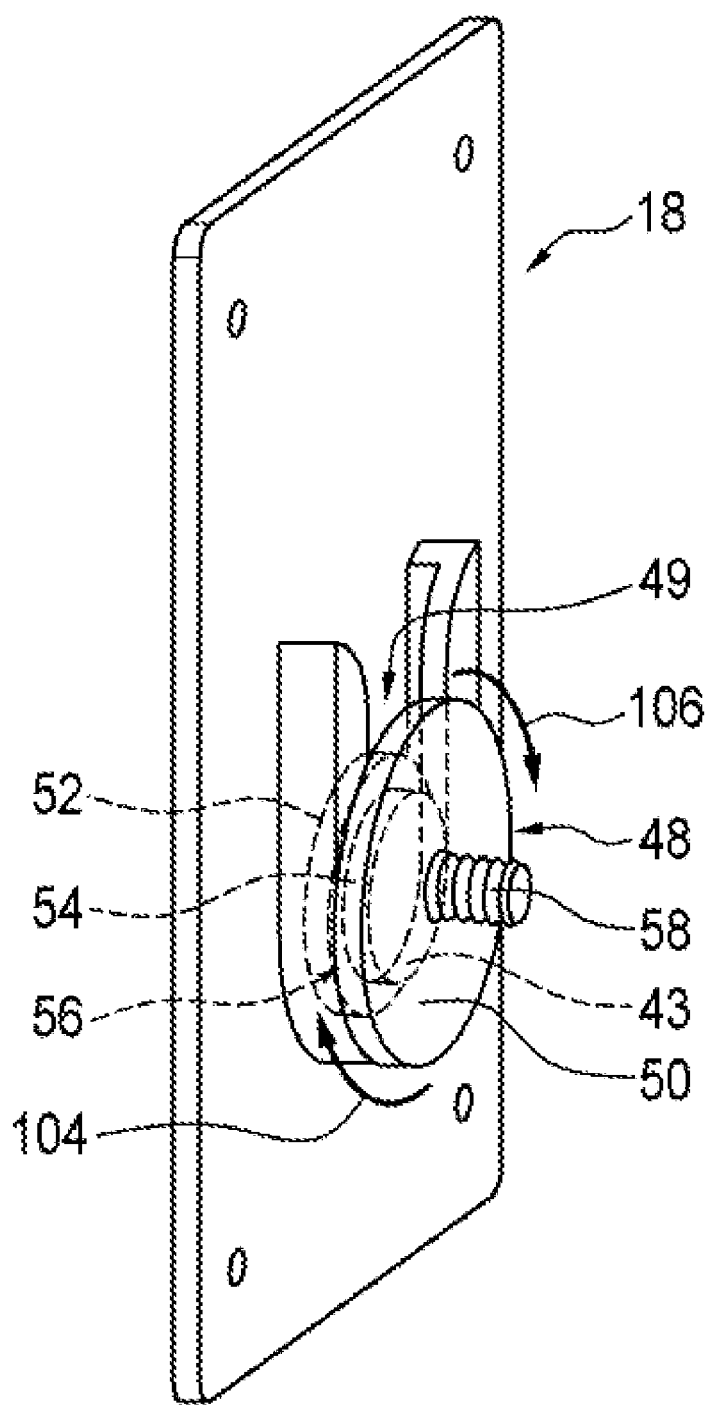
FIG. 12 is a perspective, partially in section, view showing the female connector of FIG. 6 and the male connector of FIG. 9.

As best shown in FIGS. 11 and 12, the U-shape of the slot 49 of the female connector 18 and the generally annular shape of the male connector 48 allow the male connector 48 to be rotatably received by the female connector 18. Referring to FIG. 11, in particular, a first one of the plates 52 of the male connector 48 is slidably received by the U-shaped slot 49 of the female connector 18. Said first one of the plates 52 is received though the opening 47 between the channels 44 and 46 as indicated by broken lines 100 and 102. As best shown in FIG. 12, when said first one of the plates 52 of the male connector 48 is received by the U-shaped slot 49 of the female connector 18, the cylindrical block 54 of the male connector 48 rests on the lip 43 of the pocket 42, which is shown in FIG. 6, of the female connector 18. The annular recess 56 of the male connector 18 engages the lip 43 of the pocket 42 of the female connector 18. Accordingly, the plates 50 and 52 of male connector 40 are on opposite sides of the U-shaped slot 49 of the female connector 18. This prevents accidental decoupling of the male connector 48 and the female connector 18 while still allowing the male connector 48 to rotated bi-directionally relative to the female connector 18 as indicated generally by arrows 104 and 106.

In operation, the threaded member 58 of the male connector 48 is engaged with the threaded female tripod receiver 15 of the camera 14 as shown in FIG. 20. The male connector 48 can then be coupled, as described above, to the female connector 18 which is mounted on the person 10 by the strap assembly 22 as shown in FIG. 3. This allows the person 10 to carry the camera 14 in a hands-free manner, at chest level, as shown in FIGS. 1 to 3. The camera 14 can be rapidly and easily removed from the device 12 because the male connector 48 is simply slidably received by the female connector 18. Furthermore, because the male connector 48 is rotatably coupled to the female connector 18, the carried camera 14 can be rotated between the first position shown in FIG. 1 and the second position shown in FIG. 3. This provides the advantage of allowing the person 10 to view digital photographs, or video, on the camera screen 16 disposed on the carried camera 14 and change the lens 18 of the carried camera 14.

Figure 15:
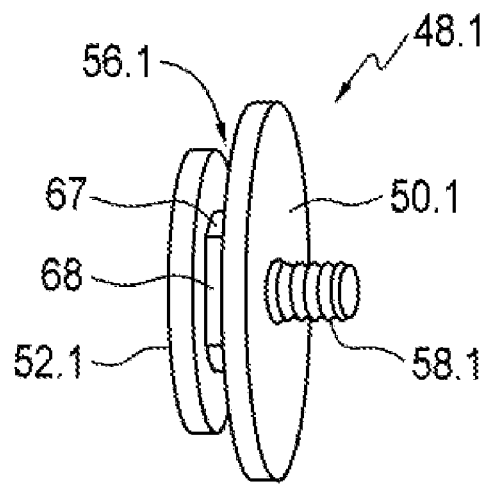
FIG. 15 is a perspective view of another embodiment of the male connector of the device of FIG. 4.
Figure 16:
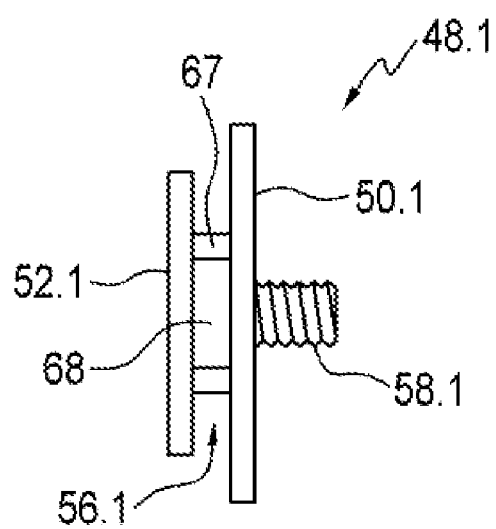
FIG. 16 is a side elevation view of the male connector of FIG. 15.
Figure 17:
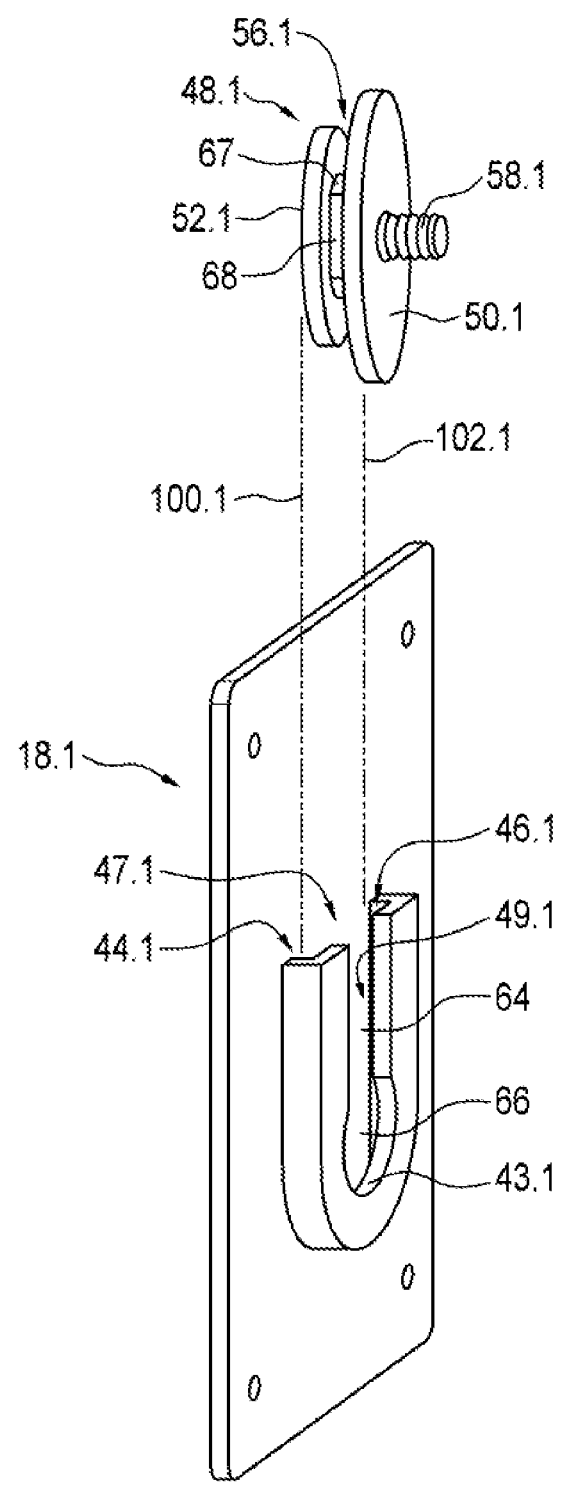
FIG. 17 is an exploded view showing the female connector of FIG. 13 and the male connector of the FIG. 15.
Figure 18:
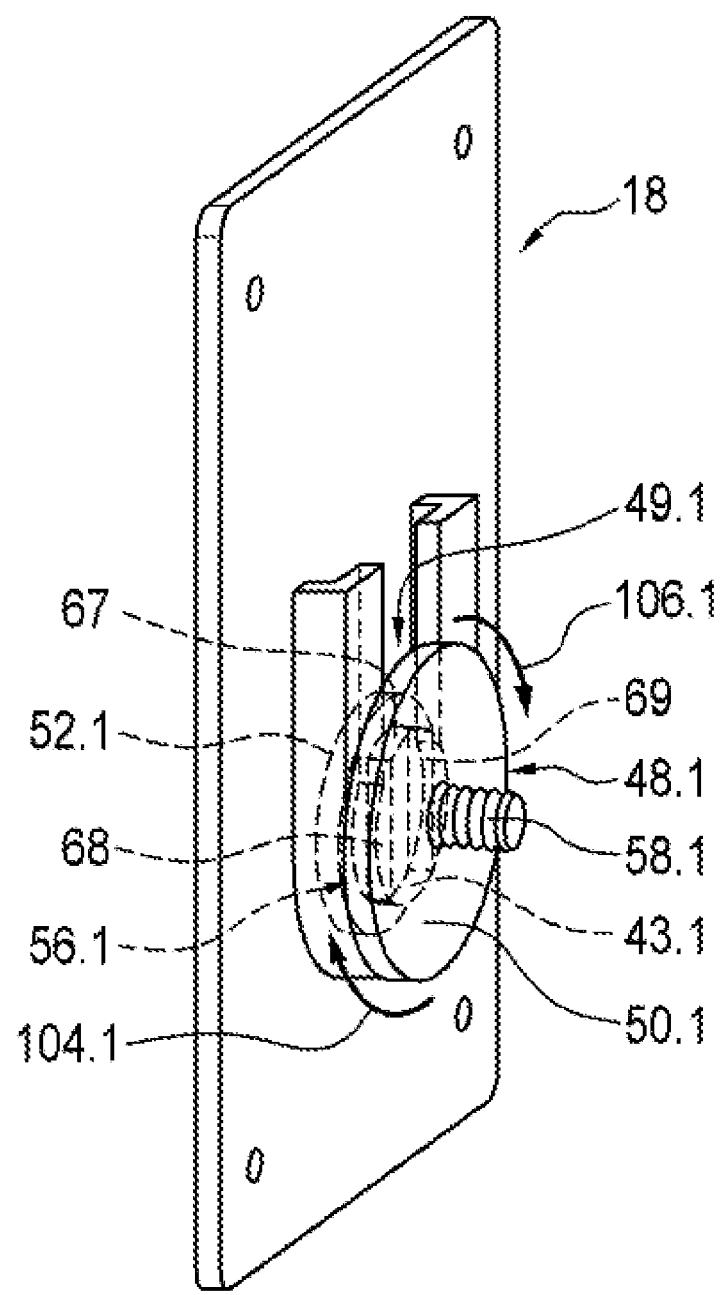
FIG. 18 is a perspective, partially in section, view showing the female connector of FIG. 13 and the male connector of the FIG. 15 in a releasable position.
Figure 19:
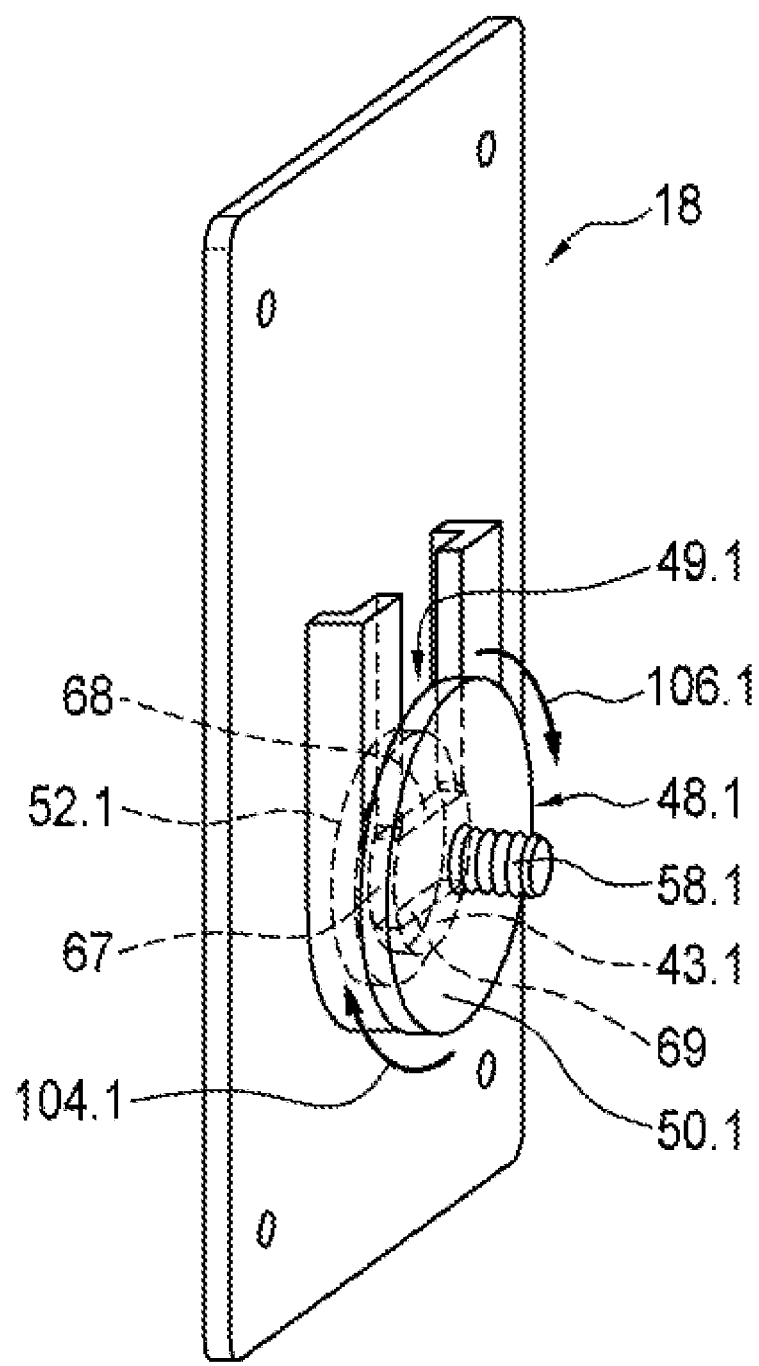
FIG. 19 is a perspective, partially in section, view showing the female connector of FIG. 13 and the male connector of the FIG. 15 in a locked position.

Referring now to FIGS. 13 and 14 another embodiment of the female connector 18.1 is shown. In FIGS. 13 and 14 like parts have been given like reference numerals as in FIGS. 7 and 8 with the additional numerical designation ".1". The U-shaped protrusion 40.1 of the female connector 18.1 has a bulb shaped opening defined by an elongate portion 64 and circular portion 66. FIGS. 15 and 16 show an embodiment of the male connector 48.1 which is used with the female connector 18.1 shown in FIGS. 13 and 14. In FIGS. 15 and 16 like parts have been given like reference numerals as in FIGS. 9 and 10 with the additional numerical designation ".1". A truncated cylindrical body 67 of the male connector 48.1 has a pair of opposite flat edges 68 and 69. Only a first one the flats edge 68 is shown in FIGS. 15 to 17 with both flat edges 68 and 69 being shown in FIGS. 18 and 19. In FIGS. 17 to 19 like parts have been given like reference numerals as in FIGS. 11 and 12 with the additional numerical designation ".1".

Referring now to FIG. 17, the male connector 48.1 is only received by the female connector 18.1 in a particular circumstance. In particular, the flat edges 68 and 69 of the truncated cylindrical body 67 of the male connector 48.1 must be aligned with the elongate portion 64 of the bulb shaped opening in the U-shaped protrusion 40.1 of the female connector 18.1, i.e with channels 44.1 and 46.1. Otherwise the cross-extent of the body truncated cylindrical body 67 of the male connector 48.1 will be too wide to pass through the elongate portion 64 of the bulb shaped opening in the U-shaped protrusion 40.1 of the female connector 18.1.

Once the male connector 48.1 has been received by the female connector 18.1, as shown in FIG. 18, the male connector 48.1 may be rotated as indicated by either arrow 104.1 or 106.1. The flat edges 68 and 69 of the truncated cylindrical body 67 of the male connector 48.1 are brought out of alignment with the elongate portion 64 of the bulb shaped opening in the U-shaped protrusion 40.1 of the female connector 18.1. This is shown in FIG. 19. In this position the male connector 48.1 is locked in place and cannot be decoupled from the female connector 18.1. To release the male connector 48.1 from the female connector 18.1, the male connector 48.1 is rotated as indicated by either arrows 104.1 or 106.1 to bring the flat edges 68 and 69 of the truncated cylindrical body 67 of the male connector 48.1 back into alignment with the elongate portion 64 of the bulb shaped opening in the U-shaped protrusion 40.1 of the female connector 18.1. This is shown in FIG. 18. This locking mechanism prevents the carried camera 14 from becoming accidentally decoupled from the device 12.

It will be understood by a person skilled in the art that although in this example the male connector is secured to the camera and the female connector is mounted on the person's chest that in other examples a male connector may be secured to the camera and a female connector may be mounted on the person's chest. Alternatively, any suitable means to rotatably mount the camera may be used. For example, in another embodiment, the plates of the male connector may be rotatably connected to each other allowing for a squared plate to be received by the female connector while still allowing for rotation of the mounted camera.

It will further be understood by someone skilled in the art that many of the details provided above are by way of example only and are not intended to limit the scope of the invention which is to be determined with reference to the following claims.

What is claimed is:

1. A device for rotatably mounting a camera on a torso of a person, the camera having a threaded female tripod receiver, and the device comprising:
    a female connector having a U-shaped slot defined by a curved pocket and a pair of opposed channels which extend from the pocket;
    a male connector having a plate, the plate being slidably received by the U-shaped slot of the female connector, and the plate being freely rotatable within the U-shaped slot of the female connector;
    a threaded member extending from the male connector concentrically of the plate of the male connector, the threaded member being for engaging the threaded female tripod receiver of the camera; and
    a strap assembly connected to a jacket, the female connector being connected to the jacket and the strap assembly including a plurality of straps to position the jacket and the female connector substantially in a front middle portion of the torso of the person.

2. The device as claimed in claim 1 wherein the female connector is disposed within the jacket.

3. The device as claimed in claim 2 wherein the jacket includes means for allowing additional equipment to be connected to the device.

4. The device as claimed in claim 1 wherein the strap assembly includes means for allowing additional equipment to be connected to the device.

5. The device as claimed in claim 1 wherein the female connector includes a plate and a U-shaped protrusion, the U-shaped protrusion being integral with and protruding from the plate.

6. The device as claimed in claim 1 wherein the plate of the male connector is a circular plate.

7. The device as claimed in claim 6 wherein the male connector further includes another plate which is spaced-apart from the circular plate by a cylindrical body, the threaded member extending from said another plate which is spaced-apart from the circular plate.

8. The device as claimed in claim 1 wherein the strap assembly further includes a tarp for covering the camera.

9. A device for rotatably mounting a camera on a torso of a person, the camera having a threaded tripod receiver, the device comprising:
    a female connector having a U-shaped slot defined by a semi-circular pocket and a pair of opposed channels which extend from the pocket, the U-shaped slot having a bulb shaped opening defined by a circular aperture in the pocket and an elongate space between the opposed channels;
    a male connector having a circular plate and a truncated substantially cylindrical body concentrically mounted on the plate, the plate being slidably received by the U-shaped slot of the female connector, and the plate being freely rotatable within the pocket of the U-shaped slot of the female connector when the substantially cylindrical body extends through the circular aperture in the pocket of the U-shaped slot, the substantially cylindrical body having a flat edge;
    a threaded member extending from the male connector concentrically of the circular plate of the male connector, the threaded member being for engaging the threaded tripod receiver of the camera; and
    a strap assembly connected to a jacket, the female connector being connected to the jacket and the strap assembly including a plurality of straps to position the jacket and the female connector substantially in a front middle portion of the torso of the person;
    wherein the circular plate has a first rotatable position within the pocket of the female connector in which the male connector is secured to the female connector, and a second rotatable position within the pocket of the female connector in which the male connector is releasable from the female connector and wherein the female connector is disposed within the jacket.

10. The device as claimed in claim 9 wherein the jacket includes means for allowing additional equipment to be connected to the device.

11. The device as claimed in claim 9 wherein the strap includes means for allowing additional equipment to be connected to the device.

12. The device as claimed in claim 9 wherein the female connector is defined by a plate and a U-shaped protrusion, the U-shaped protrusion being integral with and protruding from the plate.

13. The device as claimed in claim 9 wherein the male connector includes a second plate and the truncated substantially cylindrical body is disposed between the plates.

14. A device for rotatably mounting a camera on a torso of a person, the camera having a threaded tripod receiver, the device comprising:
   a plurality of straps;
   a jacket connected to said plurality of straps so as to position the jacket substantially in a front middle portion of the torso of the person;
   a female connector having a U-shaped slot defined by a semi-circular pocket and a pair of opposed channels which extend from the pocket, the female connector being attached to the jacket;
   a male connector having a circular plate and a substantially cylindrical body concentrically mounted on the plate, the plate being slidably received by the U-shaped slot of the female connector, and the plate being freely rotatable within the pocket of the U-shaped slot of the female connector when the male connector is received by the female connector; and
   a threaded member extending from the male connector concentrically of the circular plate of the male connector, the threaded member being for engaging the threaded tripod receiver of the camera;
   wherein the circular plate has a first rotatable position within the pocket of the female connector in which the male connector is secured to the female connector, and a second rotatable position within the pocket of the female connector in which the male connector is releasable from the female connector.

* * * * *